United States Patent
Willman et al.

(10) Patent No.: US 7,574,610 B2
(45) Date of Patent: Aug. 11, 2009

(54) SECURITY STATE WATCHER

(75) Inventors: Bryan Mark Willman, Kirkland, WA (US); Christine M. Chew, Redmond, WA (US); Paul C. Roberts, Kirkland, WA (US); David Rudolph Wooten, Redmond, WA (US); John E. Paff, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/954,917

(22) Filed: Sep. 30, 2004

(65) Prior Publication Data

US 2006/0075264 A1    Apr. 6, 2006

(51) Int. Cl.
*G06F 11/30* (2006.01)
*G06F 12/14* (2006.01)
(52) U.S. Cl. .................. 713/194; 380/52; 257/922; 726/9; 726/22; 726/26; 726/27; 726/28; 726/29; 726/30
(58) Field of Classification Search ......... 713/193–194, 713/156; 726/2–9, 22, 26–36; 380/52; 714/E11.207; 257/922

See application file for complete search history.

(56) References Cited

U.S. PATENT DOCUMENTS

| 5,566,339 | A | * | 10/1996 | Perholtz et al. | 713/340 |
| 6,170,067 | B1 | * | 1/2001 | Liu et al. | 714/48 |
| 2003/0120935 | A1 | * | 6/2003 | Teal et al. | 713/188 |
| 2006/0288407 | A1 | * | 12/2006 | Naslund et al. | 726/9 |

* cited by examiner

*Primary Examiner*—Kambiz Zand
*Assistant Examiner*—Kari L Schmidt
(74) *Attorney, Agent, or Firm*—Woodcock Washburn LLP (57) ABSTRACT

A security device watches over the secure functionality in a computer system. This "watcher" security device may be integrated within the computer system or may be separate from it. The security device queries the secure functionality to determine whether the state of the secure functionality is acceptable. If no satisfactory state exists, or if no response is received, then a signal is transmitted. The signal may be auditory (a buzzer) or visual (a flashing light) in order to signal to any user that the secure functionality has been compromised. Optionally, human input devices may be disabled, or a monitoring service notified, in conjunction with or in lieu of the signal. If the secure functionality includes a secret shared between the secure functionality and the user, then the security device may signal the secret. For example, where the secret is visual, the security device may display the secret. Where there is more than one element of secure functionality in the computer system, the security device may separately watch and report on more than one element of secure functionality. The security device may also display status information regarding the computer system. Some or all of the security device may be distributed via a trusted distribution infrastructure.

54 Claims, 5 Drawing Sheets

SECURITY STATE WATCHER

FIELD OF THE INVENTION

The present invention relates generally to the field of computer security. More particularly, the invention relates to an independently reliable state indicator reflecting the trustworthiness or security of an internal state of a computer system.

BACKGROUND OF THE INVENTION

In modern computing, many tasks which can be performed on a computer require some level of security. In order to provide a level of security, there are several options. One is to perform all secure applications on a computer which is completely separate from any possibly insecure elements, or to use a virtual machine monitor (VMM) to allow complete separation between two execution environments (e.g. operating systems) running on a single computer system. However, this may be impractical. There may be a need, for cost or convenience reasons, for a secure execution environment to share resources with applications with unassured security, and those applications and those resources may be vulnerable to an attacker. Additionally, where a VMM is used, since a VMM requires full virtualization of the machine and all of its devices (thereby requiring that the VMM provide its own device driver for every possible device), a VMM is not well suited to an open architecture machine in which an almost limitless variety of devices can be added to the machine.

One way to provide the ability to share resources among two execution environments is to provide a computer system in which there is one "main" operating system that controls most processes and devices on a machine, and where a second operating system also exists. This second operating system is a small, limited-purpose operating system alongside the main operating system which performs certain limited tasks. One way to make an operating system "small" or "limited-purpose" is to allow the small operating system to borrow certain infrastructure (e.g., the scheduling facility, the memory manager, the device drivers, etc.) from the "main" operating system.

Certain other techniques allow operating systems to exist side-by-side. One such technique is to have one operating system act as a "host" for the other operating system. (The operating system that the "host" is hosting is sometimes called a "guest.") In this case, the host operating system provides the guest with resources such as memory and processor time. Another such technique is the use of an "exokernel." An exokernel manages certain devices (e.g., the processor and the memory), and also manages certain types of interaction between the operating systems, although an exokernel—unlike a VMM—does not virtualize the entire machine. Even when an exokernel is used, it may be the case that one operating system (e.g., the "main" operating system) provides much of the infrastructure for the other, in which case the main operating system can still be referred to as the "host," and the smaller operating system as the "guest." Likewise, an actual trustworthy hypervisor may run on the machine, supporting "host" and "guest" partitions in which the "host" partitions provide many services to "guest" partitions that import most services and focus on security. The hosting model, the hypervisor/VMM model, and the exokernel model allow useful types of interaction between operating systems that support sharing of infrastructure.

Thus, these techniques can be used to provide a computer system with at least two execution environments. One of these execution environments may be a "high-assurance" operating system, referred to herein as a "nexus." A high-assurance operating system is one that provides a certain level of assurance as to its behavior. For example, a nexus might be employed to work with secret information (e.g., cryptographic keys, etc.) that should not be divulged, by providing a curtained memory that is guaranteed not to leak information to the world outside of the nexus, and by permitting only certain certified applications to execute under the nexus and to access the curtained memory.

In a computer system with two execution environments, one of which is a nexus, it may be desirable for the nexus to be the guest operating system, and a second operating system, not subject to the same level of assurance as to behavior, to be the host operating system. This allows the nexus to be as small as possible. A small nexus allows a higher level of confidence in the assurance provided by the nexus. Therefore operating system functions are run by the host operating system.

One such operating system which may be run by the host operating system is a windowing system. When using a windowing system, a user's display will be populated with windows, areas on the screen which display information from an application. An application may have one or more windows. One window of all the windows displayed may have focus. The focus window may be indicated by a different border around the window, for example.

In traditional windowing systems, when a window has focus, it is generally the object of the user's input. Therefore, if a user types information using a keyboard, in many cases, the keystroke data will be sent by the operating system to the application which owns the window which has focus. Some keystrokes and other input actions may not be sent to the application which owns the window with focus. For example, in some windowing systems there is a keystroke command which minimizes all windows. Such a command will be handled by the windowing system, and not sent to the application owning the window with focus. The application owning the focused-on window may receive notification of the minimization of the window; however, the user keystrokes are intended for the windowing system, not the application owning the window having focus, and will not be sent to that application.

When the windowing system is run by the host operating system, rather than by the nexus, it is vulnerable to attack. This causes a problem because, as described, the windowing system tracks which window will receive user input by tracking which window has focus. Therefore an attack can be mounted on the system by shifting the focus without the user noticing, or even without indications which the user can notice.

An attack may occur, for example, via a program running on the host which switches the focus and captures keystrokes. The user is led to believe that the user's input will be directed towards a trustworthy entity—some hardware, system software, application, or window which is running in the nexus. However, at some point the focus shifts. The user input instead is being directed to the attacking program, where it is captured and may be used later.

Thus, because the windowing system is under the control of the host operating system and the user's input is generally directed to the window having focus at the time of the input, the high-assurance nature of the nexus is imperiled. Although the invention is described with reference to a windowing system, there may be other systems in which there are two or more levels of assurance, and where a user may choose which entity (e.g. an application) to interact with. In these systems, as well, certain input must be kept secure from lower-assurance applications and entities, and the same problems described above occur. Further, the present invention has value for systems which have only a single secure level—i.e., just as the present invention can address the security problem that exists in a dual mode system where focus is changed without the user noticing, it can also address the problem in a single-security-mode system where an entirely fake system is booted in place of the real system. That is, the present invention allows the user to know that the right single-level-secure system is running, rather than some attacker presenting an entirely fraudulent UI. In fact, as a general rule, a human being cannot tell by inspection whether they are interacting with a secure component or an unsecure one.

Therefore, any time there is a human access resource in which a high assurance UI is desired, and particularly when UI of varying levels of security is presented in parallel, a watcher is advantageous.

Another possible attack is known as a spoof. A spoof is an attack in which the user is led to believe that some hardware, system software, application or agent software, or a given window, is a trustworthy entity, even though it is not. The attacker is spoofing a trustworthy entity. This can be used to steal user credentials, or to capture other data of a sensitive nature entered by a user who thinks that the user is using a highly assured entity.

For example, in a system in which the nexus runs a banking program with a log-in screen, an attacker may write a program which runs on the host operating system, and displays a window which looks exactly like the log-in screen of the banking program. When the user is fooled by this spoof window, the user will enter information into the spoof window. This information is captured by the attacker and may then be used by the attacker without the knowledge of the user.

The windowing system is also vulnerable to an attack known as a snooker. In a snooker attack, the attacker changes the user display to make it appear to a user that the system is secure, when it is not. For example, a computer system may include the ability for a user to lock the system, or to allow the computer to sleep or hibernate. A snooker attack, in this case, would simulate the screen displayed when the system is locked, asleep, or hibernating. When the user turns their attention away, thinking that the system is inactive and secure, the attacker makes unauthorized use of the system.

Generally, whatever pattern of pixels a legitimate nexus-side program or functioning system can produce on the monitor, an attacking program on the host-side can imitate. Because any software can draw any pixels on a display, set any lights on a keyboard, or make any waveform, it is not possible for a human being to tell by simple inspection that a given computer is or is not a trusted computer, or whether that possibly trustable computer is currently running in a trustable mode. Some attacks force the machine out of a trustworthy state and yet are relatively "silent"—meaning the machine could go from trustworthy to untrustworthy in a very short time, and the user might not notice. However, in order to maintain the high assurance nature of the nexus, a user must be able to distinguish a legitimate nexus-side user interface graphic element from a fake one.

In view of the foregoing there is a need for a system that overcomes the drawbacks of the prior art.

SUMMARY OF THE INVENTION

According to one embodiment of the invention, a security device connected to a computer system which includes some secure functionality "watches" the secure functionality and provides an indication of the security state of the machine. In one embodiment, the security device queries the status of the secure functionality of the computer system. In one embodiment, this query determines whether the secure functionality has been compromised. In alternate embodiments, the query determines the secure functionality (e.g. the nexus) or another part of the computer system is receiving user input or providing information to the user. Obtaining other status information about the secure functionality via the query is also contemplated.

Preferably, a security device includes at least some of the following features: an independent power supply (e.g., battery, solar cell, etc.), or a way to alert the user when power is lost; an independent clock (i.e., a way to measure time that is not dependent on the system being watched, or on external time sources whose reliability is not assured); an independent capacity for computation (e.g., its own processor); at least some independent memory (e.g., as a workspace for performing computations in a manner that cannot be compromised from outside of the device, or, if the security devices relies on an external verifying entity, then sufficient independent memory to store information from which the correct external verifying entity can be identified). These resources are preferably independent components, but can also be physically integrated with the computer system; the effectiveness of such a design depends on how tamper-resistant the device is.

The status information is used to determine whether the secure functionality is in an unsatisfactory state. If such an unsatisfactory state exists, then the user is alerted. This allows an independent confirmation of correct functioning of the secure functionality of the computer system. In one embodiment, the security device determines whether a satisfactory state exists by challenging the security functionality with a challenge only answerable by a satisfactorily running security functionality. In one embodiment, the challenge is cryptographic in some way. In one embodiment, the query/signal occurs with at least a given periodicity, e.g., once per second. Preferably, failure to reply in a timely fashion is treated the same as a failure to reply entirely; thus, it is preferable that a security device performing the watcher function have its own (trustworthy and reliable) clock.

In one embodiment, the computer system is queried for a status for the secure functionality. If no response is received, the security device signals. If the response is not satisfactory, the security device signals with a second, possibly different signal.

The alert to the user may consist of a visual signal, such as a flashing or changing visual display, an auditory signal, such as tones, beeps, buzzing, or other noises, or a tactile signal, such as a vibration. Any combination of these alerts may be used to alert the user.

In another embodiment, the security device also provides an indication of other status information regarding the secure functionality. For example, in a case, as described above, where there are environments with different assurance levels (such as a host and a nexus), the security device may display information indicating which assurance level is active at any time, and thus, e.g., where user input will be directed. The security device, in other embodiments, indicates when a switch occurs between the two execution environments, or when one execution environment shuts down. Where a higher-assurance execution environment contains secret data, e.g. an image which is not known by the second execution environment or a color used to frame a window displayed by the higher-assurance execution environment, this secret may be obtained from the higher-assurance execution environment and displayed by the security device.

In one embodiment, the security device functions as a "dead man's switch" for the secure functionality. That is, in the absence of an indication from the secure functionality that the security state is satisfactory, the security device assumes that something is unsatisfactory, and alerts the user. Because the security device is intended to detect attacks on the secure functionality, and alerts the user in the case of such attacks, the security device should be protected from attacks. One obvious mode of attack is disabling power to the security device. Thus, in one embodiment, a power supply separate from the power supply of the computer system is provided for the security device. In another embodiment, the power supply of the computer system is used, however, a backup power supply is provided for the security device which allows an alert to be sounded if the computer system power supply is or becomes unavailable to the security device.

In one embodiment, the act of raising an alert includes sending a message via an out-of-computer channel to a central monitoring service. Thus, the security device can inform not only the user of a security problem, but can also communicate the problem in a reliable, trustworthy way to a computer administrator.

In one embodiment, the act of raising an alert includes directing human input devices, or a hub servicing human input devices, to turn off, either for a short time, or for an extended time. Thus, when the system is in a state that is not secure (or where security cannot be verified), the user can be prevented from entering data into the system, since such data might include sensitive data that might be stolen by the system in the non-secure state.

The security device may be integrated into the computer system in some way. For example, the security device may be embedded into a keyboard, a monitor, a mouse, or a computer case. In another embodiment, the security device is separate from the computer system, but may be placed proximal to all or part of it, or attached to it, e.g. by a clip, or by a hook and latch fastener attachment.

In one embodiment, the security device is connected to the computer system by one or more of the following types of connections: a USB (universal serial bus) connection; a serial port connection, a 1394 connection (a connection running according to the IEEE-1394 protocol, informally known as "FireWire"), a SCSI (small computer system interface) connection, or an Ethernet connection. It might also use parallel, serial, modem, or wireless. The security device can use any digital channel which allows it to exchange (crypto) queries and replies with the secure system, so long as the round-trip message time is short by human interaction standards.

The security device, in one embodiment, includes an options interface which receives user commands for changing the operation of the security device. The options interface is provided via the computer system, as long as it is not determined that the secure functionality of the computer system is in an unsatisfactory state.

There may be a number of different elements of secure functionality in a system. For example, the display may be controlled, in whole or in part, by secure video functionality. This functionality may be separate from a secure user input functionality. A security device, in one embodiment, monitors more than one element of the secure functionality present in the system, by carrying on separate query and signal protocol instances with each of them.

Additionally, according to one embodiment of the invention, the security devices are delivered via a trusted distribution infrastructure. The trusted distribution infrastructure, once established, is used to deliver at least some part of the security devices. The part delivered could be any part of the security device. Purely software and purely hardware parts of the security device are contemplated as being distributed. In this way, the security of the security device is ensured.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Arrangement

Figure 1:
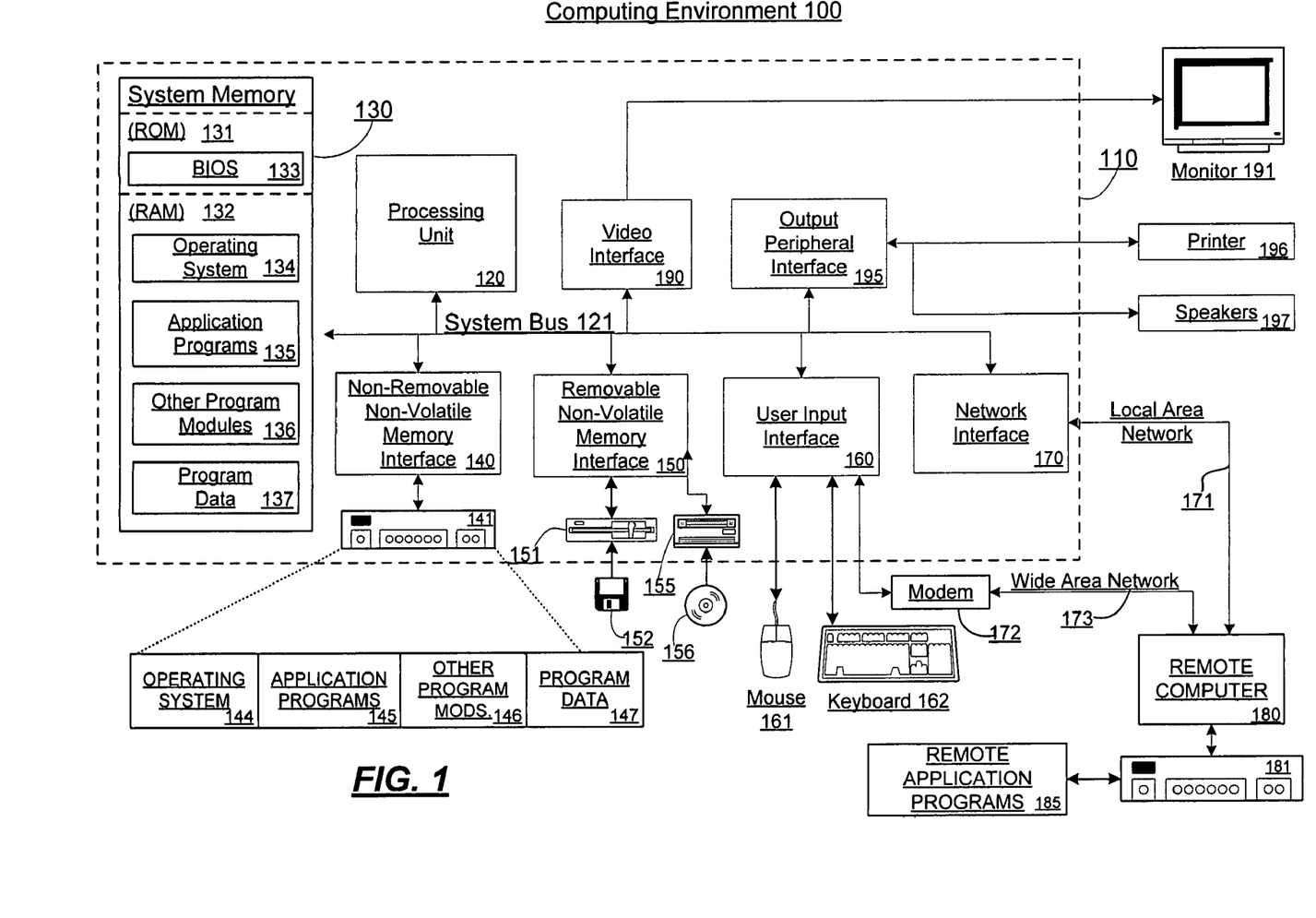
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Computing Environments on a Single Machine

As previously described, it is known in the art that two operating systems can execute side-by-side on a single computing device. One problem that the present invention can be used to address is how to provide some level of separation between two operating system, while still providing for some level of interaction between the two operating systems.

Figure 2:
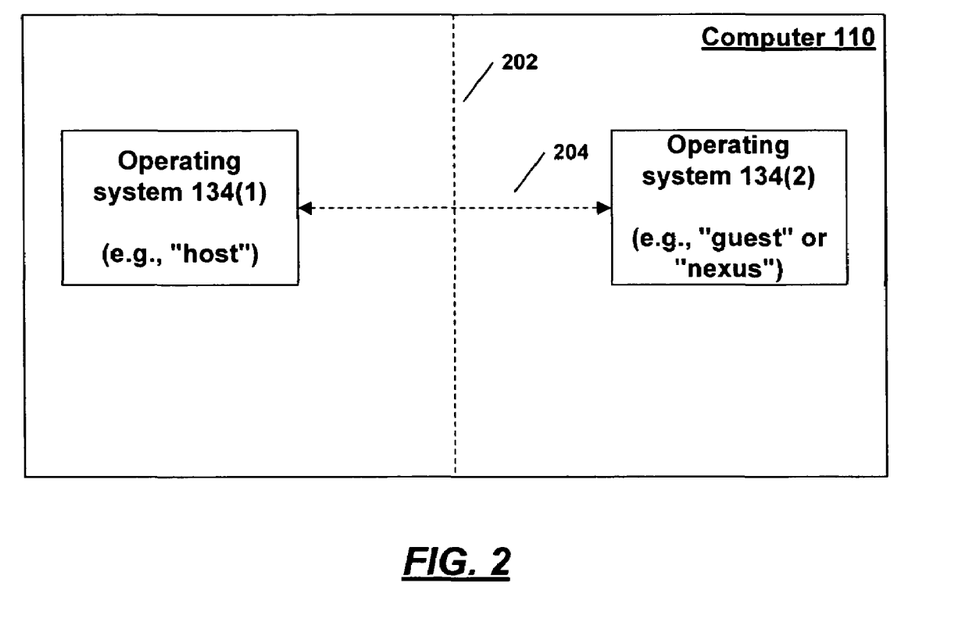
FIG. 2 is a block diagram of two exemplary execution environments that maintain some interaction with each other and some separation from each other.

FIG. 2 shows a system in which two operating systems 134(1) and 134(2) execute on a single computer 110. Some type of logical separation 202 exists between operating systems 134(1) and 134(2), such that a certain amount of interaction 204 is permitted between operating systems 134(1) and 134(2), while still allowing at least one of the operating systems to be protected against events that originate in the other operating system. In the example of FIG. 2, operating system 134(1) is a host operating system, and operating system 134(2) is a guest operating system, such as a "nexus" as described above. As previously noted, when operating system 134(2) is a nexus, it is desirable to construct separation 202 such that operating system 134(2) can interact with operating system 134(1) in order to borrow operating system 134(1)'s infrastructure, while still allowing operating system 134(2) to protect itself from actions (either malicious or innocent) that arise at operating system 134(1) and might cause operating system 134(2) to behave in a manner contrary to its behavioral specifications. (It will be understood, however, that the invention is not limited to the case where operating system 134(2) is a nexus.)

The separation 202 between operating systems 134(1) and 134(2) may, optionally, be enforced with the aid of a security monitor. A security monitor is a component external to both operating systems 134(1) and 134(2), which provides some security services that may be used to protect operating system 134(2) from operating system 134(1). For example, a security monitor may control access to certain hardware, may manage the use of memory (to give operating system 134(2) exclusive use of some portions of memory), or may facilitate the communication of data from operating system 134(1) to operating system 134(2) in a secure way. It should be noted that the use of a security monitor represents one model of how operating system 134(2) can be protected from operating system 134 (1), although the use of a security monitor is not required. As another example, operating system 134(2) could include all of the functionality necessary to protect itself from operating system 134(1).

It should be noted that FIG. 2 shows operating system 134(1) as a "host" and operating system 134(2) as a "guest." In general, this characterization refers to the fact that, in these examples, operating system 134(1) provides certain operating system infrastructure that is used by both operating systems 134(1) and 134(2) (e.g., device drivers, scheduling, etc.), and operating system 134(2) is a "guest" in the sense that it preferably lacks this infrastructure but rather uses the infrastructure of operating system 134(1). However, it should be noted that the parameters of what makes an operating system a "host" or a "guest" are flexible. Moreover, it should be noted that traditional concepts of "host" and "guest" operating systems presume that the host needs to protect itself from actions of the guest. In the example of FIG. 2, however, guest operating system 134(2) is presumed to be a high-assurance operating system that needs to protect itself from host operating system 134(1). In the examples that follow, we shall generally refer to operating system 134(1) as the "host" and operating system 134(2) as the "guest" or "nexus" for the purpose of distinguishing between them. It should be appreciated that the techniques described herein can be applied to the interaction of any two or more operating systems running on the same machine (or even on the same set of connected machines).

User Input Modes in Plural Computing Environments on a Single Machine

When a user interacts with programs on a computer system containing a high-assurance operating system, the user does so by means of a user input device, such as mouse 161 or keyboard 162 (from FIG. 1). As discussed above, allowing the windowing system running on host operating system 134(1) to control the destination of the stream of input events may allow an attack using a compromised host operating system or application.

In one embodiment, the destination of the stream of input events is controlled by a trusted user interface engine running on the nexus 134(2). Two modes are established in which the computer 110 can be operating. These two modes are standard input mode (SIM) and nexus input mode (NIM). In NIM, the user input is directed towards the nexus or towards a process running on the nexus.

Secret Sharing

In one embodiment, in order to prevent the spoofing attack described above, a secret can be displayed by the nexus which is hidden from the host-side. No process on the host side can access the secret, and therefore if a window or other graphic user interface element can display the secret, it is a host-side graphic user interface element. The nexus-user secret may be an image or a phrase. An image can be a useful nexus-user secret, because they are easily identified by the user and hard to describe. If the image selected by the user for use as the nexus-user secret is, for example, a photograph of the user's dog in front of the user's house, the photograph may be described by an attacker who views the image on the user's screen, however, even with that information an attacker would have difficulty recreating the image or finding a copy of it. A nexus-user secret may also be a window decoration, such as the border of a window being displayed by a nexus-side program. If all nexus-side windows change border color at the same time and have matching border colors, then a fraudulent nexus-side window will be easily discernable. The secret may be continually updated.

Other Secure Functionality and Other Secrets

While what has been described above is a specific secure functionality in a computer system, it is contemplated that other secure functionality may exist in a computer system. For example, in a computer system with only one execution environment, secure functionality may be provided by a software application running on the execution environment, by a hardware element of the computer system, or by some combination of software and hardware. A computer system may include secure functionality in the operating system of the system. One example is a computer system running with a trusted platform module (TPM) according to standards being set forth by the Trusted Computing Group. Generally, the invention is contemplated as being useful in any situation in which a secure functionality exists on a computer system as a monitor for the trustworthiness of the secure functionality.

Similarly, while secrets are described with reference to two execution environments, a host and a nexus, it is contemplated that any secure functionality may have an associated secret.

Security Device

Figure 3:
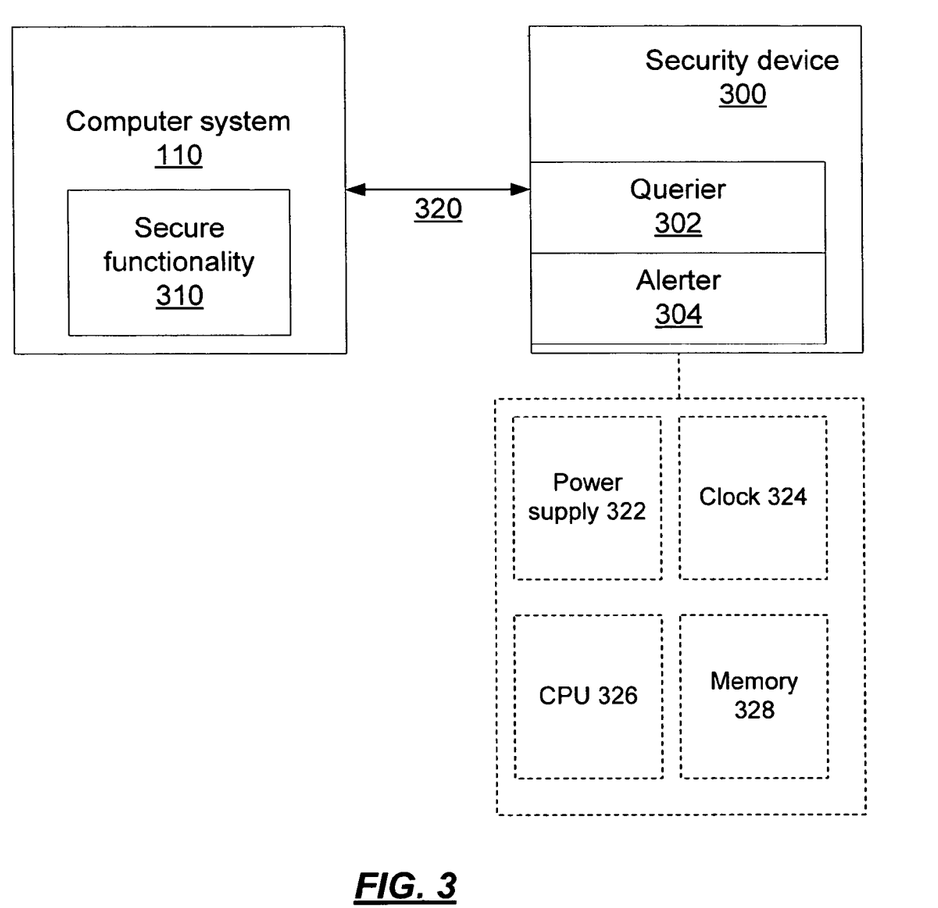
FIG. 3 is a block diagram of a computer system and security device according to one embodiment of the present invention.

FIG. 3 is a block diagram of a computer system and security device according to one embodiment of the present invention. As seen in FIG. 3, a computer system 110 contains secure functionality 310. Security device 300 includes a querier 302 and an alerter 304. The querier queries the secure functionality 310. A status is requested from the secure functionality 310. This status request may include a test or challenge, the response to which will indicate whether the secure functionality is responding. The alerter 304 alerts the user if an unsatisfactory state of the secure functionality is determined. In one embodiment, an unsatisfactory state of the secure functionality is determined if (1) the secure functionality is not responsive; or if (2) the response received is discerned as not coming from the secure functionality; or if (3) the response received from the secure functionality indicates that some security has been breached. As noted above, the ability of security device 300 to perform its function may be enhanced or enabled by the use of an independent power supply 322, an independent time source 324, an independent computation component 326, and independent memory 328.

It should be noted that the security device is not limited to the function of determining whether a particular security function is on or off (or working or not working). Rather, the security device can be configured to determine whether the security function is working "well enough" (i.e., performing up to some defined standard, or meeting some defined security criteria). In many models, the functioning of a security system is determined based on a set of attestation vectors and on the software stack; judging these features may present a difficult problem because what constitutes a valid attestation vector or software stack can vary from machine to machine and environment to environment. One way to address this problem is for the ultimate determination of a security system's functioning to be made by a judgment service that is equipped to make this determination based on information about the system being evaluated. A usage scenario with regard to such a judgment service is more particularly described below.

In one embodiment, querier 302 includes a challenger, a receiver and a responder. The challenger presents a challenge to the secure functionality 310. The receiver receives the response from the secure functionality. The evaluator evaluates the response (if any) and determines whether it is unsatisfactory.

In one embodiment, the challenge is a cryptographic challenge. The response to the cryptographic challenge can only be computed with knowledge of a secret, such as a private key. The determination of whether an unsatisfactory response has been received from the secure functionality 310, then, is a determination as to whether the challenge has been properly responded to.

There may be more than one secure functionality on the computer system 110. For example, secure functionality related to an execution environment may be separate from secure functionality which secures a trusted display of data on a display. Thus, in one embodiment, the security device 300 monitors two or more secure functions on the computer system 110.

The alert to the user from the alerter 304 may consist of a visual signal, such as a flashing or changing visual display, an auditory signal, such as tones, beeps, buzzing, or other noises, or a tactile signal, such as a vibration. Any combination of these alerts may be used to alert the user. Additionally, as part of the alert, the user input devices may be disabled (e.g., in order to prevent the user from providing sensitive information to a system that is not secure), and a remote monitoring center (such as one associated with a system administrator) may be notified of the alert. Any other way of providing an alert to a user is also contemplated.

In one embodiment, the querier 302 queries the secure functionality 310 at least once in any given period of time. The periodicity of the query, then, ensures that the secure functionality 310 is assayed to determine if it is in a satisfactory state at least once in each given period. In one embodiment, the querier 302 checks the state of the secure functionality 310 once per second.

The connection 320 between the computer system 110 and the security device 300 can be of any type. Notably, it does not need to be a physical connection, but can be accomplished via wireless or other means. In one embodiment, a secure connection is used, so that the connection is impervious to changes by an attacker, or to snooping by an attacker. In one embodiment, the security device is connected to the computer system by one or more of the following types of connections: a USB (universal serial bus) connection; a serial port connection, a 1394 connection (a connection running according to the IEEE-1394 protocol, informally known as "FireWire"), a SCSI (small computer system interface) connection, or an Ethernet connection.

While FIG. 3 shows the security device 300 as being separate from the computer system 110, it may be that the security device 300 is incorporated into the computer system 110. The security device may be integrated into the computer system 110 as part of some physical part of the computer system, such as, without limitation, a casing containing all or part of the computer system, the keyboard 162, the pointing device 161, or the monitor 191 or other display.

Figure 4:
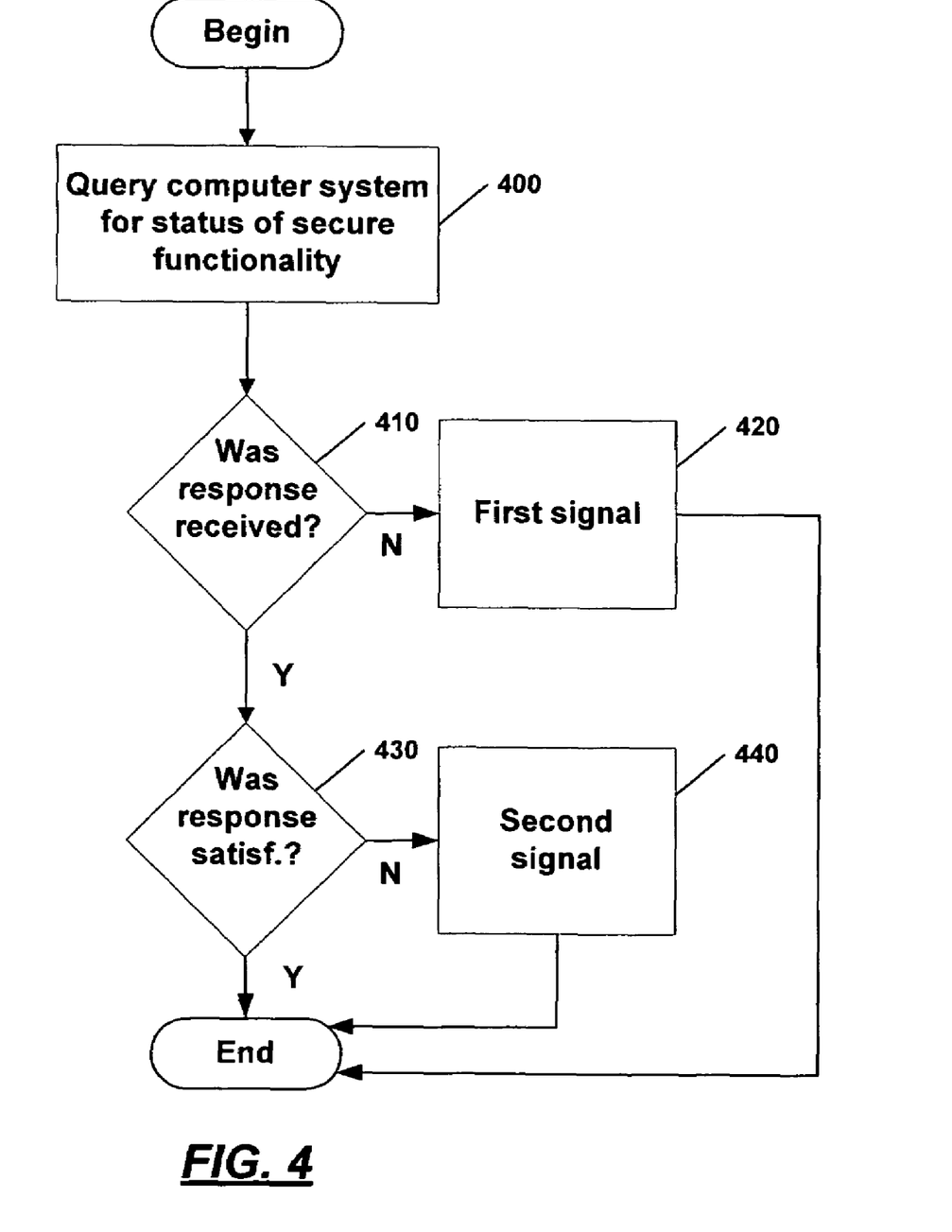
FIG. 4 is a flow diagram of a method for displaying information to a user according to one embodiment of the invention.

FIG. 4 is a flow diagram of a method for displaying information to a user according to one embodiment of the invention. In step 400, the computer system is queried for a status for a secure functionality. In step 410, a determination is made as to whether a response has been received. If no response is received, step 420, a first signal is signaled. In step 430, a determination is made, if a response is received, as to whether the response was satisfactory. If the response is not satisfactory, step 440, then a second signal is signaled. In step 410, a set period of time may elapse before the determination is made as to whether the response has been received. The process may be repeated with a given periodicity in order to ensure that the information signaled to the user remains true. The first and second signal may be identical. In one embodiment, a different signal may be signaled if a satisfactory response was received.

Power Supply

Figure 5:
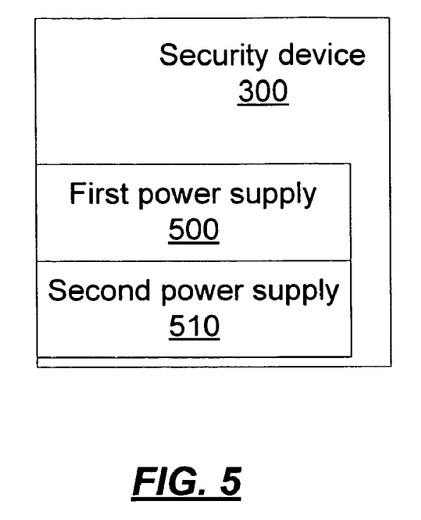
FIG. 5 is a block diagram of the power supply for a security device according to one embodiment of the present invention.

FIG. 5 is a block diagram of the power supply for a security device according to one embodiment of the present invention. The security device 300, in one embodiment, alerts the user if a condition of the secure functionality 310 is not satisfactory. One possible attack, therefore, is to silence the security device 300. An adversary may attempt to do this by disabling the security device 300 by disabling its power supply. In order to counteract this, in one embodiment, the security device 300 includes a first power supply 500. The alerter 304 may be configured to signal the user if the first power supply 500 is low on power. In one embodiment, as shown, a second power supply 510 is included. The second power supply 510 serves as a backup for the first power supply 500. If the first power supply 500 loses power, the second power supply 510 causes alerter 304 to signal the user. For example, the first power supply 500 may be a connection to an electrical outlet. It may be a battery pack. First power supply 500 may also be a connection to a power supply for the computer system 110. If something goes wrong with the first power supply 500, then the second power supply 510 alerts the user of that fact. In one embodiment, second power supply 510 is a battery.

Judgment Service

As noted above, a security device (or "watcher") in accordance with the invention may use an external judgment service to determine whether a security system that is being "watched" is functioning sufficiently well (i.e., performing up to a relevant standard). The following describes an example scenario in which such a judgment service is used. The user obtains a watcher, and via the trusted distribution infrastructure, has the watcher loaded with, e.g., the name, address, and confirming crypto credentials of a "judgment service", or perhaps several such services. The data loaded into the watcher includes judgment service account data, so that billing/payment of the judgment service may be coordinated.

The user may also program the watcher to reflect the user's beliefs and policies on trust. The user does this programming via some aid in the trusted distribution infrastructure. At this point, the watcher knows how to contact a Judgment Service, and what to tell it the user wants.

Next, the watcher attempts to learn the relevant information about the system being watched, so that this information may be communicated to, and evaluated by, the judgment server (or "verifying service"). In one example embodiment, The user approaches a system of interest, and "hooks up" the watcher. The watcher initially sends a challenge to the system, and gets back a "quote", which is a crypto statement about what is on the machine. In theory this alone tells us whether to trust the secure-component of the machine, but the vector may be complicated and hard to understand. The watcher takes the quote result in and consults the watcher's remembered list of known good attestations. If the attestation is not in that list, or is too old, or fails some other test, the watcher sends a message to the secure component to be passed onto the Judgment Service. The message sent to the judgment service is a crypto message. If it does not reach the Judgment Service, or does not come back, the watcher times out, and raises one of its alarms. (In this case, it means the "secure component" could not be validated at all, as opposed to meaning that the secure-component has failed to respond.) If an appropriate crypto message is returned from the Judgment Service, the watcher will interpret this message, and cache this result. The message may contain variety of data, but above all, it reports on whether the attestation vector of the system of interest meets the standards that the user specified. If the answer is "yes", things proceed as described elsewhere in this patent. If the answer is no, an alarm is raised.

As an alternative scenario, the watcher creates a packet encrypted using the public key of the judgment service that it wants to use. That packet contains a nonce, and the policy statement of the watcher. It gives this packet along with the URL of the desired judgment service to the system being checked. That system negotiates with the judgment service and the judgment service gathers whatever information is needed to see if the checked system meets the policy statements from the watcher. At the end of the checking, the judgment service sends an encrypted packet (using private key of judgment service) to the watcher indicating whether or not the system meets the policy. The nonce is used to insure that the response is unique. An advantage to this technique is that the watcher does not have to be in the middle of trying to validate the configuration. A quote received from the system may or may not be meaningful, and thus the quote itself may not tell whether the system meets the relevant policy. There may be log information that can be used to resolve any ambiguity, in which case the logs would been needed along with the quote. However, it may be advantageous for the watcher not to be in the middle of this conversation between the verifier and verifiee.

In addition to providing binary (e.g., "good/not good") information about the system, the Judgment Service might inform the watcher which status protocols in the secure component are reliable, or give it other information to aid correct configuration.

The following is an example of the use of a judgment service. In this example, the watcher is programmed to contact WindowsVerify.microsoft.com with account number 12345 and settings paranoid=7, minos=r5.7, revokeonevil=yes, cache_time_out=7 days. When a user walks up to a system and plugs the watcher in, it does the work specified above. If WindowsVerify.microsoft.com likes the system (i.e., finds it to be acceptable under the relevant standard), this is cached for 7 days, meaning that the watcher can decide the system is OK so long as it sees the same attestation vector for the next 7 days.

Note that in this example, if WindowsVerify.microsoft.com learns that the hardware is bad, or that there's a bad SMI bios, or a buggy hypervisor, it can pass knowledge of this to every watcher as they call it, so users can be told to stop trusting broken systems in something close to real time.

Other Security Device Indications

The security device, in addition to alerting the user if an unsatisfactory state of the secure functionality 310 is determined, may provide a display (or other indication) of the status of the secure functionality. Thus, in one embodiment, a green light is displayed if the secure functionality is in a satisfactory state, and a red light if it is not in a satisfactory state. Where there is a host and nexus in the computer system 110, such a display indicates that which of the host or the nexus is active. Where the nexus input mode (NIM) and standard input mode (SIM) states are possible for the computer system 110, in one embodiment the alerter indicates the input mode of the computer system 110. In another embodiment, the alerter may signal when a switch is made, from the host being active to the nexus being active, from the nexus being active to the host being active, or from the NIM to the SIM state, or from the SIM to the NIM state. In one embodiment, when the secure functionality is stopped/shut down, the alerter indicates that fact.

As described above, it is possible for the secure functionality to contain information on a secret which is not accessible to other parts of the computer system 110. In such a case, in one embodiment, the security device includes the ability to display or otherwise indicate that secret. Thus, for example, where the secret is a photograph, the security device may display the photograph. As a further example, where the secret is the color of window borders displayed by the secure functionality, the security device displays that color. Other visual secrets and non-visual secrets are also contemplated.

Security Device Options

In one embodiment, the security device may be programmed, options changed, or status checked using security device options. For example, the periodicity of the checks of the secure functionality 310 may be user-tunable via setting of security device options. A user may request a check of the state of a power supply such as a battery. The security device may include input/output means for a user to request such device option changes and receive information. Alternatively, an options interface is provided via the computer system 110. In order to ensure that the options are not changed by an adversary, in one embodiment the options interface can only be accessed if the secure functionality of the computer system is not in an unsatisfactory state. Additionally, as noted above, the security device may cut off input devices or send a message to a remote monitoring station if the system whose security is being evaluated is not in an acceptably secure state. Additionally, the security device may be adapted to judge the security of a device by sending a message to a remote judgment service over a network, which evaluates the security of the secure component of the device that is being monitored.

Distribution of Security Devices

Figure 6:
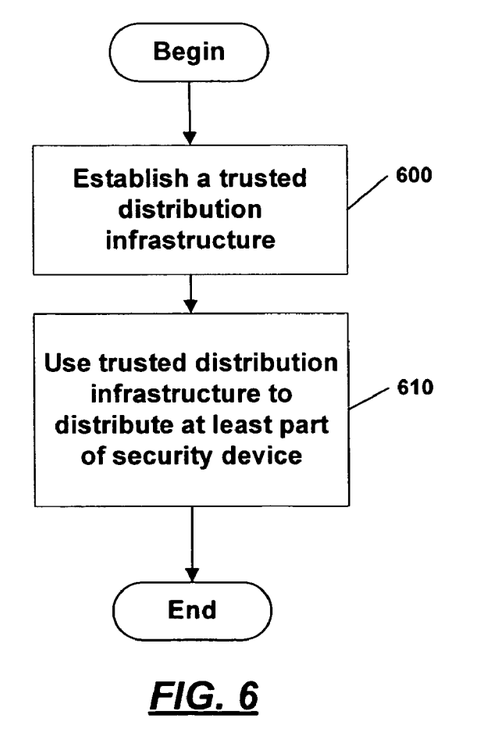
FIG. 6 is a flow diagram of a method for providing for the security of a computer system comprising secure functionality according to one embodiment of the invention.

A security device can not be trusted if it has been compromised by an attacker, or if it is received from an untrusted source. Thus, according to one embodiment of the invention, a trusted distribution infrastructure (which might include a computer network) is used to distribute the security device. FIG. 6 is a flow diagram of a method for providing for the security of a computer system comprising secure functionality. As seen in FIG. 6, step 600 is the establishment of a trusted distribution infrastructure. The trusted distribution infrastructure may be established in a already-trusted location. For example, the trusted distribution infrastructure may be a bank, post office, or trusted vendor.

The distribution network is then used, in step 610, to distribute at least some part of a security device. All or only some of the security device may be distributed. For example, a specific physical element (e.g. a hardware part) of a security device may be distributed via the distribution network. The physical element may include an anti-tampering device, such as an indication of trusted source (e.g. a hologram) or visual indication that the physical element has not been tampered with or altered. The distribution need not be physical, but may be informational. Thus, a piece of software may be licensed and distributed via the distribution network. The trustworthiness of the software, in one embodiment, is verifiable through cryptographic means.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A security device for use with a computer system comprising at least two execution environments, wherein a first execution environment includes a host operating system comprising a relatively lower assurance operating system and a second execution environment includes a guest operating system comprising a relatively higher assurance operating system, the guest operating system including one or more security functions, wherein the security device is configured to monitor an internal state of the computer system and to determine a state of the guest operating system, the security device comprising:

a querier connected to said computer system and configured to request a status from said guest operating system of said computer system; and a user alerter connected to said querier, said user alerter configured to signal if an unsatisfactory state of said guest operating system is determined, wherein said unsatisfactory state is determined to exist when said guest operating system is not responsive, a response received from said guest operating system is discerned as not coming from said guest operating system, or a response received from said guest operating system indicates a security breach.

2. The security device of claim 1, further comprising:
a first power supply powering said user alerter.

3. The security device of claim 2, where said user alerter signals if said first power supply is low on power.

4. The security device of claim 2, further comprising:
a backup power supply powering said user alerter.

5. The security device of claim 4, where said user alerter signals if said first power supply is disconnected.

6. The security device of claim 1, further comprising an independent clock.

7. The security device of claim 1, where said security device is embedded in the same physical case as an element of said computer system.

8. The security device of claim 7, where said element comprises at least one selected from among the following: a keyboard; a monitor; a casing; a mouse, or a hub.

9. The security device of claim 1, where said querier comprises:

a challenger for presenting a challenge to said guest operating system;

a receiver for receiving a response, if any, from said guest; operating system; and an evaluator for evaluating said response to determine whether said response, if any, is unsatisfactory.

10. The security device of claim 9 in which the evaluator queries a judgment service to determine whether the guest operating system is satisfactory.

11. The device of 10 which caches answers from the query to the judgment service.

12. The device of 10 which allows the user to specify a judgment service to consult, and a standard to be used in interpreting an answer provided by the judgment service.

13. The security device of claim 10 which the evaluator queries information from the guest operating system, and passes this to a judgment service for evaluation.

14. The security device of claim 10 in which the evaluator instructs the guest operating system to obtain a judgment from the judgment service, and return said judgment to the evaluator.

15. The security device of claim 10 in which the evaluator queries information from the guest operating system, and passes the information to a judgment service for evaluation.

16. The security device of claim 10 in which the evaluator instructs the guest operating system to obtain a judgment from the judgment service, and return said judgment to the evaluator.

17. The security device of claim 1, where said connection to said computer system comprises a connection of at least one type selected from among the following: a USB connection; a serial port connection, a 1394 connection, a SCSI connection, or an Ethernet connection.

18. The security device of claim 1, where said signaling by said user alerter comprises one or more of the following: a visual signal; a flashing visual display; an auditory signal; one or more tones; a tactile signal; and a vibration.

19. The security device of claim 1, where said signaling by said user alerter comprises disabling at least some human input devices attached to the computer by disabling a hub to which they are attached.

20. The security device of 19 wherein disabling at least some human input devices comprises directly signaling at least one of the human input devices.

21. The security device of claim 1, where said signaling by said user alerter includes sending a message to a central monitoring service.

22. The security device of claim 1, where said user alerter further comprises:
 a status indicator for indicating the status of said guest operating system.

23. The security device of claim 22, where said status indicator indicates whether said first execution environment or said second execution environment is active.

24. The device of claim 23, wherein the device uses a display to indicate to the user which of several security components are failing initial evaluation, failing to respond to ongoing evaluation, have lost focus, and/or have shut down.

25. The security device of claim 23, where said status indicator indicates that a change has occurred in which of said first execution environment or said second execution environment is active.

26. The security device of claim 22, where said status indicator provides an indication when said guest operating system is being shut down.

27. The security device of claim 22, where said guest operating system can display a secret, and where said status display displays said secret.

28. The security device of claim 1, where said security device further comprises:
 an options interface for receiving user commands for changing the operation of said security device.

29. The security device of claim 28, where, if an unsatisfactory state of said guest operating system is not determined, said options interface receives said user commands via said computer system.

30. A method for signaling information to a user regarding the internal state of a computer system comprising at least two execution environments, wherein a first execution environment includes a host operating system comprising a relatively lower assurance operating system and a second execution environment includes a guest operating system comprising a relatively higher assurance operating system, the guest operating system including one or more security functions, said method comprising:
 querying said computer system for a status for said guest operating system; where
  if no response is received to said querying said computer system, signaling said user with a first signal; and
  if a response is received to said querying said computer system;
   determining based upon the response whether each of the security functions is working at a defined security standard;
   determining said response is an unsatisfactory response if it is determined that one or more of the security functions is not working at a defined security standard; and
   if said response is an unsatisfactory response, signaling said user with a second signal.

31. The method of claim 30, wherein signaling the user if an unsatisfactory response or no response is received is performed using a second signal.

32. The method of claim 30, where said querying said computer system comprises:
 challenging said guest operating system with a cryptographic challenge.

33. The method of claim 32, where said signaling said user if an unsatisfactory response is received comprises:
 evaluating said response to determine whether said cryptographic challenge has been appropriately answered; and
 if said cryptographic challenge has not been appropriately answered, signaling said user that an unsatisfactory response was received.

34. The method of claim 30, where said steps of querying said computer system for a status, signaling said user if no response is received, and signaling said user if an unsatisfactory response is received occur with at least a predetermined periodicity.

35. The method of claim 34, where said periodicity is once per second.

36. The method of claim 30, further comprising:
 signaling said user if a power source is low on power.

37. The method of claim 30, where said first signal and said second signal each comprise at least one or more of the following: a visual signal; a flashing visual display; an auditory signal; one or more tones; a tactile signal; a vibration; disabling of human input; and sending a message to a monitoring service.

38. The method of claim 30, further comprising:
 indicating said status of said guest operating system.

39. The method of claim 38, where said indicating of said status of said guest operating system comprises:
 indicating whether said first execution environment or said second execution environment is active.

40. The method of claim 39, where said indicating said status of said guest operating system comprises:
 indicating that a change has occurred in which of said first execution environment or said second execution environment is active.

41. The method of claim 38, where indication said status of said guest operating system comprises:
 indicating that said guest operating system is being shut down.

42. The method of claim 38, where said guest operating system can display a secret, and where said status of said guest operating system comprises:
 displaying said secret.

43. A computer-readable storage media including computer executable instructions for signaling information to a user regarding the internal state of a computer system comprising at least two execution environments, wherein a first execution environment includes a host operating system comprising a relatively lower assurance operating system and a second execution environment includes a guest operating system comprising a relatively higher assurance operating system, the guest operating system including one or more security functions, said computer-executable instructions when processed by a processor implementing a method comprising:

querying said computer system for a status of said guest operating system;

determining whether a response is received to said query;

signaling said user with a first signal if no response is received to said query, or determining based upon a response whether each of the security functions is working at a defined security standard;

determining said response is an unsatisfactory response if it is determined that one or more of the security functions is not working at said defined security standard; and signaling said user with a second signal if an unsatisfactory response is received from said computer system.

44. The computer-readable storage media of claim 43, where said acts occur with at least a predetermined periodicity.

45. The computer-readable media of claim 44, wherein said predetermined periodicity is measured with a clock that is independent of said computer system.

46. The computer-readable storage media of claim 43, wherein said act of signaling comprises disabling one or more human input devices.

47. The computer-readable medium of claim 43, wherein the response is determined to be satisfactory or unsatisfactory based on a communication with a judgment service.

48. A method for providing for the internal security of a computer system comprising at least two execution environments, wherein a first execution environment includes a host operating system comprising a relatively lower assurance operating system and a second execution environment includes a guest operating system comprising a relatively higher assurance operating system, the guest operating system including one or more security functions a secure functionality, said method comprising:

establishing a trusted distribution infrastructure; and distributing at least a first part of a security device via said trusted distribution infrastructure, where said security device comprises a querier requesting a status from said guest operating system of said computer system, connected to said computer system, and a user alerter connected to said querier, said user alerter signaling if an unsatisfactory state of said guest operating system is determined, said user alerter further signaling if said querier fails to retrieve said status, wherein said querier includes:

a challenger for presenting a challenge to said guest operating system;

a receiver for receiving a response, if any, from said guest operating system; and an evaluator for evaluating whether said response is unsatisfactory by querying a judgment service to determine whether said guest operating system, wherein a user specifies said judgment service to consult and a standard to be used in interpreting an answer provided by said judgment service.

49. The method of claim 48, where said distribution of at least a first part of a security device comprises physical distribution of a physical element of said security device.

50. The method of claim 49, wherein said physical element comprises an independent clock.

51. The method of claim 49, where said physical element comprises an anti-tampering device.

52. The method of claim 49, where said anti-tampering device comprises a visual indication of trustworthiness.

53. The method of claim 48, where said distribution of at least a first part of a security device comprises distribution of software code for said security device.

54. The method of claim 53, where trustworthiness of said software code is verifiable through cryptography.

* * * * *